United States Patent Office 3,391,199
Patented July 2, 1968

3,391,199
PHENOL PREPARATION
Jack B. Feder, Dumont, N.J., and Alvin D. Silber, Riverdale, N.Y., assignors to Halcon International, Inc., a corporation of Delaware
No Drawing. Continuation of application Ser. No. 111,122, Apr. 11, 1961. This application Aug. 22, 1966, Ser. No. 573,792
4 Claims. (Cl. 260—621)

ABSTRACT OF THE DISCLOSURE

The present invention relates to the preparation of phenol from an oxygenated cyclohexane fraction by a process involving alkaline treatment of the oxygenated fraction and dehydrogenation to produce the phenol.

---

This case is a continuation of copending application Ser. No. 111,122, filed Apr. 11, 1961, now abandoned.

This invention relates to a process for preparing phenol, and more particularly to a process for converting an impure oxygenated cyclohexane cut or fraction to pure phenol in high yields by catalytic dehydrogenation and distillation, and especially to such a process wherein the feed is given an alkaline treatment prior to contact with the catalyst.

Phenol, a very important industrial chemical, may be prepared by catalytically dehydrogenating cyclohexanone or cyclohexanol. However, difficulties are encountered in maintaining catalyst life. Impure feedstocks are found to deactivate the dehydrogenation catalyst in the course of use. Shutdown of the plant, removal and regeneration of catalyst, and reloading it are then required. The art is confronted by the problem of providing processes for obtaining pure phenol in an economical manner, especially from impure oxygenated cyclohexane material.

The discoveries associated with the invention relating to solution of the above problems and the objects achieved in accordance with the invention as described herein include the provision of:

A process for preparing phenol or a lower alkyl substituted phenol from a crude corresponding oxygenated cyclohexane fraction containing at least one member of the group consisting of cyclohexanone and cyclohexanol by vaporizing the fraction and diluting it with hydrogen in an amount in the range of 1 to 15 mols of hydrogen per mol of total cyclohexanone and cyclohexanol therein and contacting the resulting mixture with a dehydrogenation catalyst at a temperature in the range of 250° to 425° C. at a liquid hourly space velocity in the range of 0.3 to 2.5 per hour and recovery phenol from the reaction product, including the improvement of washing the fraction with alkaline material prior to contacting it with the dehydrogenation catalyst;

Such a process wherein the catalyst is platinum-on-carbon and the fraction is contacted with aqueous alkaline material to remove acidic materials and other components detrimental to the hydrogenation catalyst;

Such a process wherein the treating temperature is within the range of the freezing temperature of the system and the boiling temperature of the system;

Such a process wherein the alkaline material is aqueous caustic and, after contact, the fraction is water washed until the washings are free of alkaline material;

Such a process wherein the fraction ultimately used as a feedstock boils in the range of 73° C. at 34 mm. Hg to 205° C. at 6 mm. Hg;

Such a process wherein the amount of hydrogen is in the range of 0.08 to 0.16 gram per gram of fraction;

And other objects which will be apparent as details or embodiments of the invention are set forth hereinafter.

In order to indicate still more fully the nature of the present invention, the following examples of typical procedures are set forth, in which parts and percent mean part and percent by weight, respectively, unless otherwise indicated, it being understood that these examples are presented as illustrative only and are not intended to limit the scope of the invention.

EXAMPLE 1

Cyclohexane is subjected to an air oxidation at 150° C. and super atmospheric pressure in the presence of a cobalt naphthenate catalyst so as to give a reaction mixture in which about 10% of the cyclohexane is oxidized. After removal of unreacted cyclohexane, the reaction mixture is vacuum distilled and a cut is obtained as a charge stock for dehydrogenation. This cut contains about 85% of cyclohexanone pulse cyclohexanol. Dehydrogenation is accomplised using a 2% platinum-on-carbon catalyst to product a crude phenol. Pure phenol is recovered therefrom by distillation.

The distillation apparatus used in this example is a one-inch diameter, vacuum jacketed, 20 actual plate, glass column (Oldershaw) equipped with a time switch operated magnetic reflux splitter condensing head of conventional design, a jacketed distillate receiver, a batch pot and heating mantle, and a vacuum pump and mercury U-tube manometer.

At the start of the oxygenated cyclohexane distillation, the pressure at the top of the column is reduced to about 34 mm. Hg, and the pot is heated to 73° C. (the head is at 60° C.) and the reflux ratio is 1 to 10. These conditions are changed in small increments until the pressure is 20 mm. Hg absolute, the pot temperature is 125° C. (the head temperature is 71° C.) and the reflux ratio is 1 to 20 (reflux to product).

A vigorous mixing of the distillate feed cut with a sodium sulfite saturated, water solution of 10% sodium hydroxide is performed. This tends to remove impurities and neutralize organic acid present. The organic layer separated, dried by azeotropic distillation, with toluene, and then flash distilled.

The dehydrogenation step is carried out with the feedstock in the vapor phase, using a platinum (2%) on activated carbon dehydrogenation catalyst. The feedstock is diluted with added hydrogen (0.08 to 0.16 gram of hydrogen per gram of feedstock). The mixture is contacted with the catalyst at 375° C. at a liquid hourly space velocity of 0.7 per hour. This produces 87.4 parts of product per 85 parts of cyclohexanone and cyclohexanol in the charge of feedstock, and this product analyses 88.6% phenol.

Pure phenol (exceeding the U.S.P. freeze point specification) is obtained from the above mentioned product by distillation in a 30 plate column of the above described type further equipped with a condensing head having a decanter tube (Dean-Stark), using a reflux ratio of 33 to 1, a pot temperature of about 113° C., and a head temperature of 99° C. The yields correspond to the above mentioned analysis.

COMPARATIVE EXAMPLE A

The procedure of Example 1 is repeated except that the charge of feedstock is given no alkaline treatment. Conversion drops from about 95% to less than 20% after 69 hours of operation. Conversion is also low for a 1:1 mixture of pure cyclohexanone and cyclohexanol feedstock subsequently passed over the catalyst bed at these same operating conditions, clearly showing the criticality of the treatment.

Comparable results to the foregoing are obtained with various modifications thereof including the following. Any basic material such as potassium hydroxide or sodium carbonate or the like may be substituted for sodium hydroxide in treating the feedstock, preferably, as a liquid of low solubility in the latter. The concentration of basic material used in these steps may also be varied greatly. In general, an amount of basic material in excess of the quantity needed to neutralized acidic impurities in the feedstock may be used. An amount of basic material less than the quantity necessary for complete neutralization of acidic impurities may be used but its effectiveness is lower. In place of the alkaline materials already shown, aqueous solutions of other substances characterized broadly as capable of reacting with organic acids, may be employed such, for example as $NaHCO_3$, $Na_2CO_3$, ethanol amine, triethanol amine, pyridine, quaternary alkyl ammonium hydroxides, and the like. Solutions containing any of these added substances are herein designated as alkaline solutions although they may range in pH upward from 6.0. The aqueous solution should contain at least 0.01% of the alkaline solute and only convenience in handling limits its upper concentrations. Other (inert) solutes may be included, e.g., to lower solubility in the oily material treated.

Treatment in accordance with the invention is equally applicable where other metal alcohol dehydrogenation catalysts supported on carbon or the like are used, including palladium, ruthenium, rhodium, nickel, cobalt and the like. The catalysts may be used for converting cyclohexanol and cyclohexanone to phenol or analogously dehydrogenating methyl cyclohexanol and methyl cyclohexanone to cresols, and generally, alkyl cyclohexanols and alkyl cyclohexanones to corresponding alkyl phenols. Preferably, each alkyl contains one or two carbon atoms, but up to about six carbon alkyls may be included. The treatment removes undesirable impurities that affect catalyst life, and in connection therewith the treatment removes acidic materials; however, the latter may not necessarily be the controlling factor. The treatment may be applied to the effluent from oxidation of cyclohexane, to the residue (after removing cyclohexane), or to the distillate obtained from the residue.

As indicated, the dehydrogenation step is carried out in the presence of (added) hydrogen, with the feedstock in the vapor phase, using a dehydrogenation catalyst such as platinum-on-carbon. The mixture of hydrogen, cyclohexanol and cyclohexanone is contacted with a dehydrogenation catalyst such as 0.5 to 5% platinum on carbon or equivalent material, in a zone maintained at a temperature in the range of from about broadly 250° to 425° C., desirably 325° to 400° C. and preferably 340° to 385° C., at a liquid hourly space velocity of broadly from about 0.3 to 2.5 desirably 0.6 to 1 and preferably 0.7 to 0.8. The weight ratio of hydrogen is in the range of 0.02 to 0.30, and desirably 0.08 to 0.16 gram of hydrogen per gram of feedstock containing approximately 80 to 100% cyclohexanol and/or cyclohexanone. Under these conditions there is little or no production of either benzene of cyclohexene.

The cyclohexane oxidation step is carried out in liquid phase and in the range, broadly, of from about 125° to 180° C. and preferably 130° C. The pressure should be sufficient to maintain a liquid phase and so that the partial pressure of the oxygen is about 1 to 30 p.s.i.a. Higher pressure can be used in some cases, and the partial pressure of the oxygen in the mixture can be as high as approximately 200 p.s.i.a. The rate at which air or oxygen-containing gas is fed is governed in part at least by the geometric configuration of the particular reaction zone utilized. It should, of course, not be so great as to cause flooding or undesired entrainment of the material being oxidized.

The conversion of cyclohexane can be in the range of from about broadly 3 to 16, desirably 7 to 13, and preferably about 10%. If the conversion of cyclohexane is less than approximately 3 to 5%, the steps of separating the cyclohexane from the oil is uneconomical. Conversions in excess of 16% are not desired because in general as conversion increases the relative yield of cyclohexanone and cyclohexanol based on converted cyclohexane drops and the relative yield of undesirable side products increases.

The isolation of dehydrogenation stock can be carried out after stripping the unreacted cyclohexane by any convenient means.

The dehydrogenation pressure utilized is broadly atmospheric to 100 p.s.i.g. and preferably atmospheric. The conversion of cyclohexanone and cyclohexanol to phenol is maintained in the range of from about broadly 50 to 100% and preferably at least 75% per pass. After separation of phenol, the residue may be recycled to the dehydrogenation step.

The process of this invention is adapted for use in connection with the overall process for the preparation of phenol from cyclohexane or benzene, e.g., as set forth more fully in the U.S. patent application of Alfred Saffer and Rex E. Lidov, Ser. No. 29,816, filed on May 18, 1960, and now abandoned or the phenol distillation may be carried out in two steps, phenol and lower boiling material being separated from higher boiling material in the first step, and lower boiling material being separated from the phenol in the second, as set forth more fully in the U.S. patent application of Jack B. Feder and Joseph L. Russell, Ser. No. 35,127, filed June 10, 1960, now issued Patent 3,140,243.

In view of the foregoing disclosures, variation and modifications thereof will be apparent to one skilled in the art and it is intended to include within the invention all such variations and modification except as do not come within the scope of the appended claims.

The invention is defined in the following claims.

What is claimed is:

1. The process for producing a phenol which comprises washing a crude oxygenated cyclohexane fraction formed by the liquid phase molecular oxygen oxidation of the cyclohexane in the presence of a cobalt naphthenate catalyst at a temperature in the range 125° to 180° C. with a partial pressure of oxygen of about 1 to 30 p.s.i.a. and containing organic acids and at least one member of the group consisting of cyclohexanone and cyclohexanol and lower alkyl ring substituted derivatives thereof with an aqueous alkaline solution containing at least 0.01% alkaline material, vaporizing the washed fraction, diluting the vaporized washed fraction iwth 0.02 to 0.30 gram of hydrogen per gram of total cyclohexanone and cyclohexanol therein, contacting the resulting mixture with a dehydrogenation catalyst selected from the group consisting of platinum, palladium, ruthenium, rhodium, nickel, and cobalt, at a temperature in the range of 250° C. to 425° C. at a liquid hourly space velocity in the range of 0.3 to 2.5 and recovering the phenol from the reaction product.

2. The process of claim 1 wherein the said washed fraction is washed with water until the washings are neutral and flashed prior to said vaporizing and dilution with hydrogen.

3. The process of claim 1 wherein the said washed fraction boils in the range of 73° C., at 34 mm. Hg to 205° C. at 6 mm. Hg.

4. The process for producing phenol which comprises washing a crude oxygenated cyclohexane fraction formed by the liquid phase molecular oxygen oxidation of the cyclohexane in the presence of cobalt naphthenate catalyst at a temperature in the range 125° to 180° C., with a partial pressure of oxygen of about 1 to 30 p.s.i.a. and containing organic acids and at least one member of the group consisting of cyclohexanone and cyclohexanol with an aqueous 10% by weight sodium hydroxide solution, vaporizing the washed fraction, diluting the washed vaporized fraction with 0.02 to 0.30 gram of hydrogen per gram of total cyclohexanone and cyclohexanol, contacting the resulting mixture with a platinum-on-carbon catalyst at a temperature in the range of 250° to 425° C. at a liquid hourly space velocity in the range of 0.3 to 2.5 and recovering phenol from the reaction product.

No references cited.

BERNARD HELFIN, *Acting Primary Examiner.*

LEON ZITVER, *Examiner.*

H. ROBERTS, *Assistant Examiner.*